Dec. 29, 1964  J. A. PETRIE  3,163,353
THRUST BEARING FOR FLUID FLOW MACHINES
Filed March 19, 1962  2 Sheets-Sheet 1
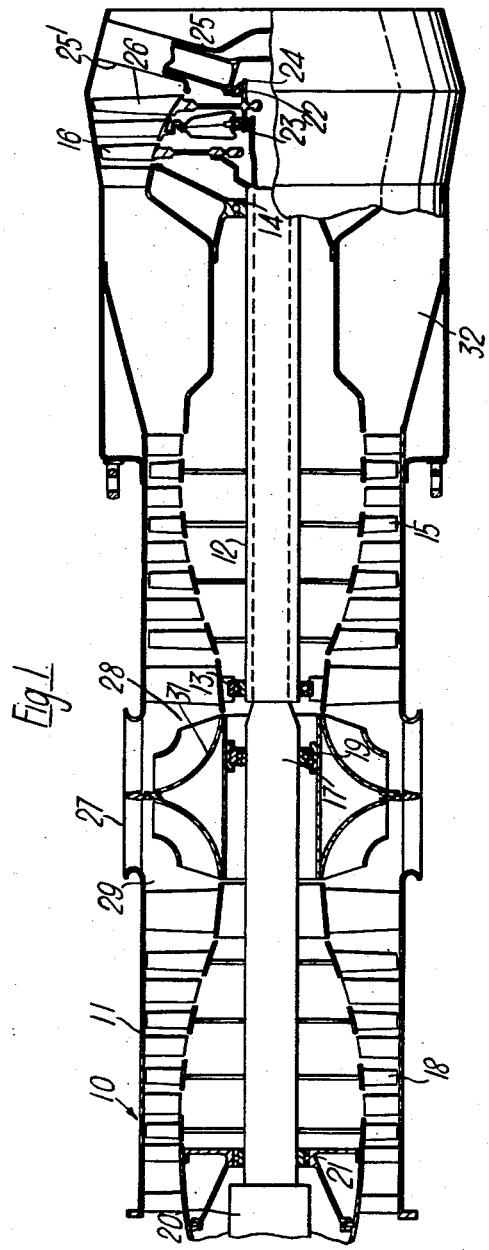
Inventor
James Alexander Petrie
By
Cushman, Darby & Cushman
Attorneys

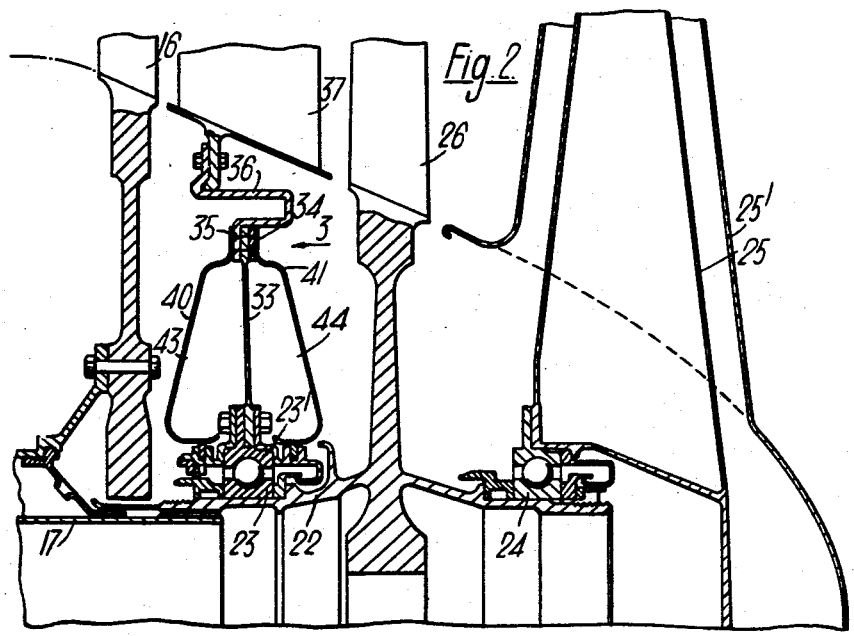
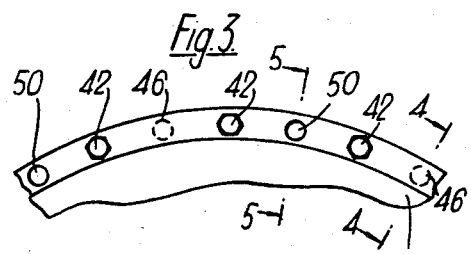
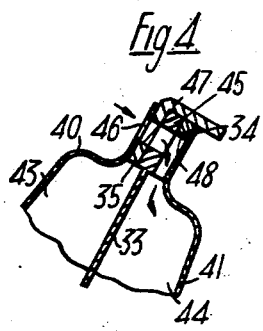
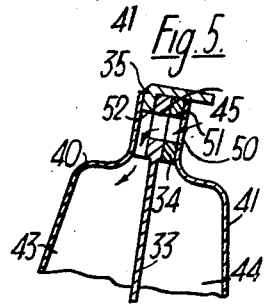

United States Patent Office 3,163,353
Patented Dec. 29, 1964

3,163,353
THRUST BEARING FOR FLUID FLOW MACHINES
James Alexander Petrie, Littleover, Derby, England, assignor to Rolls-Royce Limited, Derby, England, a company of Great Britain
Filed Mar. 19, 1962, Ser. No. 180,720
Claims priority, application Great Britain, Apr. 5, 1961, 12,253/61
13 Claims. (Cl. 230—116)

This invention concerns fluid flow machines such, for example, as gas turbine engines.

According to the present invention, there is provided a fluid flow machine comprising rotatable shafting, one or more bladed members which are mounted on said shafting and which are, in operation, subject to thrust from the working fluid passing through said machine, a thrust bearing for said shafting, said thrust bearing being arranged to be subjected to the thrust or net thrust from the bladed member or members, resilient means for urging said thrust bearing in a direction to oppose the said thrust or net thrust, and means for applying to the thrust bearing one or more fluid pressures whose effect, or net effect, is also to oppose the said thrust or net thrust.

The thrust bearing is preferably carried by and within an annular spring diaphragm which extends radially of the machine and is so biased as resiliently to oppose the said thrust or net thrust.

Means are preferably provided for subjecting the upstream and downstream sides of the diaphragm to the pressures prevailing respectively downstream and upstream of the diaphragm.

The fluid flow machine may be a gas turbine engine having a turbine or turbine stage which constitutes the said bladed member.

The said turbine or turbine stage may be mounted on shafting which is splined to a shaft carrying a compressor of the engine. The compressor may be an auxiliary compressor, the compressed air from which is not employed in the operation of the engine.

The said shaft and shafting may be mounted concentrically with respect to a shaft carrying a main compressor and a main turbine of the engine.

Preferably the main compressor and the auxiliary compressor are arranged with their inlets facing each other, air intake means being provided which are disposed between the main and auxiliary compressors and which are provided with walls which respectively direct the air into the inlets of the main and auxiliary compressors.

The air intake means is preferably covered by a protective mesh for preventing the ingress of debris.

The invention is illustrated, merely by way of example, in the accompanying drawings in which:

FIGURE 1 is a section through a gas turbine engine according to the present invention, FIGURE 2 is a broken away section showing part of the structure of FIGURE 1 on a larger scale, FIGURE 3 is a view looking in the direction of the arrow 3 of FIGURE 2, and FIGURES 4 and 5 are broken away sections taken respectively on the lines 4—4 and 5—5 of FIGURE 3.

In FIGURE 1 there is shown a gas turbine engine 10 which may, for example, be mounted vertically in an aircraft (not shown) and which is adapted to supply compressed air for the operation of blown flaps (not shown) on said aircraft.

The engine 10 has an engine casing 11 within which is rotatably mounted a shaft 12. The shaft 12, which is journalled within a front bearing 13 and a rear bearing 14, carries a main compressor 15 and a main turbine 16. Mounted concentrically within the shaft 12 is a shaft 17 on which is mounted an auxiliary compressor 18 and a fuel supply control unit 20. The shaft 17, which is provided with a thrust bearing 19, is mounted at its end adjacent the fuel supply control unit 20 in a thrust bearing 21, the opposite end of the shaft 17 being splined within a shaft 22.

The shaft 22 is mounted within thrust bearings 23, 24, the bearing 24 being supported from the engine casing 11 by hollow struts 25 each of which is mounted within a fairing 25' of aerofoil shape. Mounted on the shaft 22 is an auxiliary turbine 26.

The engine casing 11 has an annular opening 27, the main compressor 15 and the auxiliary compressor 18 having inlets 28, 29 respectively which face each other and which communicate with the annular opening 27. The annular opening 27 may be provided with an outer protective mesh (not shown) to prevent the ingress of debris.

Mounted within the casing 11 and aligned with the annular opening 27 are guide plates 31 having walls which respectively direct air into the inlets 28, 29.

The air which has been compressed by the main compressor 15 passes to combustion equipment 32, the hot gases from the combustion equipment 32 passing successively through the main turbine 16 and the auxiliary turbine 26 and thence to atmosphere.

The auxiliary turbine 26 drives the shaft 17 and hence the auxiliary compressor 18, the air compressed by the latter being supplied ot a conduit (not shown) by means of which it may pass to the above mentioned blown flaps or to some other point of use on the said aircraft.

The engine 10 is preferably adapted to be used only for very short periods during vertical take-off and landing of the said aircraft. It may therefore be of lightweight construction and its compressors 15, 18, may be made of synthetic resin material. In spite, however of this lightweight construction, the engine 10 may be such as to produce a large quantity of compressed air.

The thrust produced by the main compressor 15 and the main turbine 16 are in opposite directions and are arranged to balance eah other. The thrust produced by the auxiliary compressor 18 is exerted in a direction towards the main compressor 15 (i.e. towards the right as seen in FIGURE 1), the thrust bearing 21 being provided to deal with this thrust. The bearing 19 may be spring urged (by means not shown), so that the thrust of the auxiliary compressor 18 is shared between the bearings 19, 21.

The thrust of the auxiliary turbine 26, however, which is in a downstream direction (i.e. towards the right as seen in FIGURE 2) is taken by the thrust bearings 23, 24, and in order that the thrust bearing 23 should take its share of this thrust it is mounted as described immediately below.

The bearing 23 has an outer race 23' (FIGURE 2) which is carried by and within an annular spring diaphragm 33 which extends radially of the engine. The outer circumference of the diaphragm 33 is mounted between a ring 34, which is disposed on the downstream side of the diaphragm, and an inwardly extending annular flange 35 of a radially flexible ring 36, the flange 35 being disposed on the upstream side of the diaphragm 33. The ring 36 is secured to the roots of stator blades 37, and allows the stator blades 37 to expand radially without distorting the diaphragm 33.

Annular casings 40, 41, which are respectively disposed upstream and downstream of the diaphragm 33 bear, at their inner circumferences, against the outer race 23'. The outer circumferences of the annular casings 40, 41 are bolted to the assembly of the diaphragm 33, ring 34, and annular flange 35 by a plurality of angularly spaced apart bolts 42 (FIG. 3). The annular casings 40, 41 thus define with the diaphragm 33 an upstream chamber 43 and a downstream chamber 44.

The diaphragm 33 is provided, between each pair of adjacent bolts 42, with a hole 45. Alternate holes 45 communicate with holes 46 in the casing 40, holes 47 in the annular flange 35, and holes 48 in the ring 34. The holes 48 extend to the inner circumference of the ring 34 whereas the holes 47 do not extend to the inner circumference of the annular flange 35. Thus gases on the upstream side of the radially flexible ring 36 and annular casing 40 may pass through the said alternate holes 45 and the holes 46, 47, 48 and enter the chamber 44 so as to act on the downstream side of the diaphragm 33.

The holes 45 between the said alternate holes communicate with holes 51 in the casing 41, holes 51 in the ring 34, and holes 52 in the flange 35. The holes 52 extend to the inner circumference of the annular flange 35 whereas the holes 50 do not extend to the inner circumference of the ring 34, whereby the gases on the downstream side of the radially flexible ring 36 and annular casing 41 may enter the chamber 43 so as to act on the upstream side of the diaphragm 33.

Since the pressure of the gases upstream of the diaphragm 33 is greater than that of those downstream thereof, the diaphragm 33 will be subjected to a pressure differential acting in an upstream direction.

The diaphragm 33, in addition to being urged in an upstream direction by the pressure differential acting on it, is also resiliently biased in an upstream direction. The said resilient bias and pressure differential therefore acts in opposition to the thrust of the auxiliary turbine 26.

I claim:

1. A fluid flow machine comprising rotatable shafting, at least one bladed member which is mounted on said shafting and which is subjected to thrust from working fluid passing through said machine, a thrust bearing for said shafting, said thrust bearing being subjected to the thrust from the bladed member, resilient means for urging said thrust bearing in a direction to oppose said thrust, and means for applying to the thrust bearing at least one fluid pressure to oppose the said thrust.

2. A fluid flow machine comprising rotatable shafting, at least one bladed member which is mounted on said shafting and which is subjected to thrust from working fluid passing through said machine, a thrust bearing for said shafting, said thrust bearing being subjected to the thrust from the bladed member, an annular spring diaphragm within which the thrust bearing is mounted, the diaphragm extending radially of the machine and being biased to oppose the said thrust, and means for applying to the thrust bearing at least one fluid pressure to oppose the said thrust.

3. A fluid flow machine comprising rotatable shafting, at least one bladed member which is mounted on said shafting and which is subjected to thrust from working fluid passing through said machine, a thrust bearing for said shafting, said thrust bearing being subjected to the thrust from the bladed member, an annular spring diaphragm within which the thrust bearing is mounted, the diaphragm extending radially of the machine and being biased to oppose the said thrust, and means for subjecting the upstream and downstream sides of the diaphragm to a relatively low and a relatively high pressure, respectively.

4. A gas turbine engine comprising rotatable shafting, a turbine which is mounted on said shafting, a thrust bearing, for said shafting, said thrust bearing being subjected to the thrust from said turbine, an annular spring diaphragm within which the thrust bearing is mounted, the diaphragm extending radially of the engine and being biased to oppose said thrust, and means for subjecting the upstream and downstream sides of the diaphragm to a relatively low and a relatively high pressure, respectively.

5. A gas turbine engine comprising rotatable shafting, a turbine which is mounted on said shafting, a thrust bearing, for said shafting, said thrust bearing being subjected to the thrust from said turbine, an annular spring diaphragm within which the thrust bearing is mounted, the diaphragm extending radially of the engine and being biased to oppose said thrust, means for subjecting the upstream and downstream sides of the diaphragm to a relatively low and a relatively high pressure, respectively, a shaft which is splined to said shafting, and an engine compressor carried by said shaft.

6. A gas turbine engine, comprising rotatable shafting, a turbine which is mounted on said shafting, a thrust bearing for said shafting, said thrust bearing being subjected to the thrust from said turbine, an annular spring diaphragm within which the thrust bearing is mounted, the diaphragm extending radially of the engine and being biased to oppose said thrust, means for subjecting the upstream and downstream sides of the diaphragm to a relatively low and a relatively high pressure, respectively, a shaft which is splined to said shafting, an auxiliary compressor which is carried by said shaft, and means for leading the compressed air from the auxiliary compressor externally of the engine.

7. A gas turbine engine comprising rotatable shafting, a turbine which is mounted on said shafting, a thrust bearing for said shafting, said thrust bearing being subjected to the thrust from said turbine, an annular spring diaphragm within which the thrust bearing is mounted, the diaphragm extending radially of the engine and being biased to oppose said thrust, means for subjecting the upstream and downstream sides of the diaphragm to a relatively low and a relatively high pressure, respectively, a shaft which is splined to said shafting, an auxiliary compressor which is carried by said shaft, means for leading the compressed air from the auxiliary compressor externally of the engine, a main compressor, a main turbine, and a shaft which carries said main compressor and main turbine and which is concentrically mounted with respect to the shaft carrying the auxiliary compressor.

8. A gas turbine engine as claimed in claim 7 in which the main compressor and the auxiliary compressor are arranged with their inlets facing each other, air intake means being provided which are disposed between the main and auxiliary compressors and which are provided with walls which respectively direct the air into the inlets of the main and auxiliary compressor.

9. A fluid flow machine comprising rotatable shafting, at least one bladed member mounted on said shafting and which is subjected to thrust from working fluid passing through a fluid flow machine, a thrust bearing for said shafting, said thust bearing being subject to the thrust from said bladed member, an annular spring discharge diaphragm supporting said thrust bearing within the same, said diaphragm extending radially of the machine and being biased in a direction to oppose the thrust, a first annular casing on the upstream side of said diaphragm, said casing having its outer and inner periphery operatively supported by said diaphragm at radially spaced circumferences of the same and defining an upstream chamber, a second annular casing on the downstream side of said diaphragm, said second annular casing having its outer and inner periphery operatively supported by said diaphragm at radially spaced circumferences of the same and defining a downstream chamber, a first means for supplying a relatively high pressure from exteriorly of the upstream chamber on the upstream side of said diaphragm to the downstream chamber and a second means for supplying a relatively low pressure from exteriorly of the downstream chamber on the downstream side of said diaphragm to the upstream chamber whereby a pressure differential acts on said diaphragm in a direction which said diaphragm is biased and opposes the thrust on said thrust bearing.

10. A fluid machine as claimed in claim 9 in which said shaft means includes at least one passageway open at one end to a space exteriorly of said upstream casing and open at the other end to the downstream chamber, and in which said second means includes at least one passageway open at one end to a space exteriorly of said downstream casing and open at the other end to the upstream chamber.

11. A gas turbine engine comprising: a casing, rotatable shafting positioned within said casing, a turbine mounted on said shafting, a thrust bearing for said shafting, means to operatively support said thrust bearing from said casing, said last-mentioned means including an annular ring operatively connected to said casing, an annular spring diaphragm connected to the interior periphery of said ring and to said thrust bearing, said spring diaphragm extending radially of the engine and biased to oppose the thrust of the engine acting on said bearing, a first annular casing on the upstream side of said diaphragm, said first annular casing having its outer and inner periphery operatively supported by said diaphragm on radially spaced circumferences of the same and defining an upstream chamber, a second annular casing on the downstream side of said diaphragm, said second annular casing having its outer and inner periphery operatively supported by said diaphragm on radially spaced circumferences of the same and defining a downstream chamber, a first means for supplying a relatively high pressure from upstream of the annular ring to the interior of the downstream chamber, and a second means for supplying a relatively low pressure from downstream of said annular ring to the interior of the upstream chamber whereby a pressure differential acts on said diaphragm to load the same in the same direction as the diaphragm is biased so as to oppose the thrust on said thrust bearing.

12. A gas turbine engine as claimed in claim 11 in which said annular ring is flexible in a radial direction.

13. A fluid flow machine as claimed in claim 11 in which said means to operatively support said thrust bearing from said casing further includes stator blading supported by said casing and extending radially inwardly thereof and connected to the outer periphery of said annular ring, and in which said annular ring is radially flexible.

References Cited by the Examiner
UNITED STATES PATENTS

| | | | |
|---|---|---|---|
| 909,103 | 1/09 | Morcom et al. | 253—69 |
| 2,300,475 | 11/42 | Ward | 230—121 |
| 2,625,790 | 1/53 | Petrie | 60—39.16 |
| 2,711,074 | 6/55 | Howard | 60—39.31 |
| 2,746,671 | 5/56 | Newcomb | 253—69 |

FOREIGN PATENTS

| | | |
|---|---|---|
| 773,499 | 4/57 | Great Britain. |
| 419,779 | 4/47 | Italy. |

SAMUEL LEVINE, *Primary Examiner.*

ABRAM BLUM, *Examiner.*